Feb. 17, 1970  P. E. KOPP  3,495,309
CONTINUOUS KILN WITH VARYING TEMPERATURE ZONES
Filed June 1, 1967  2 Sheets-Sheet 1
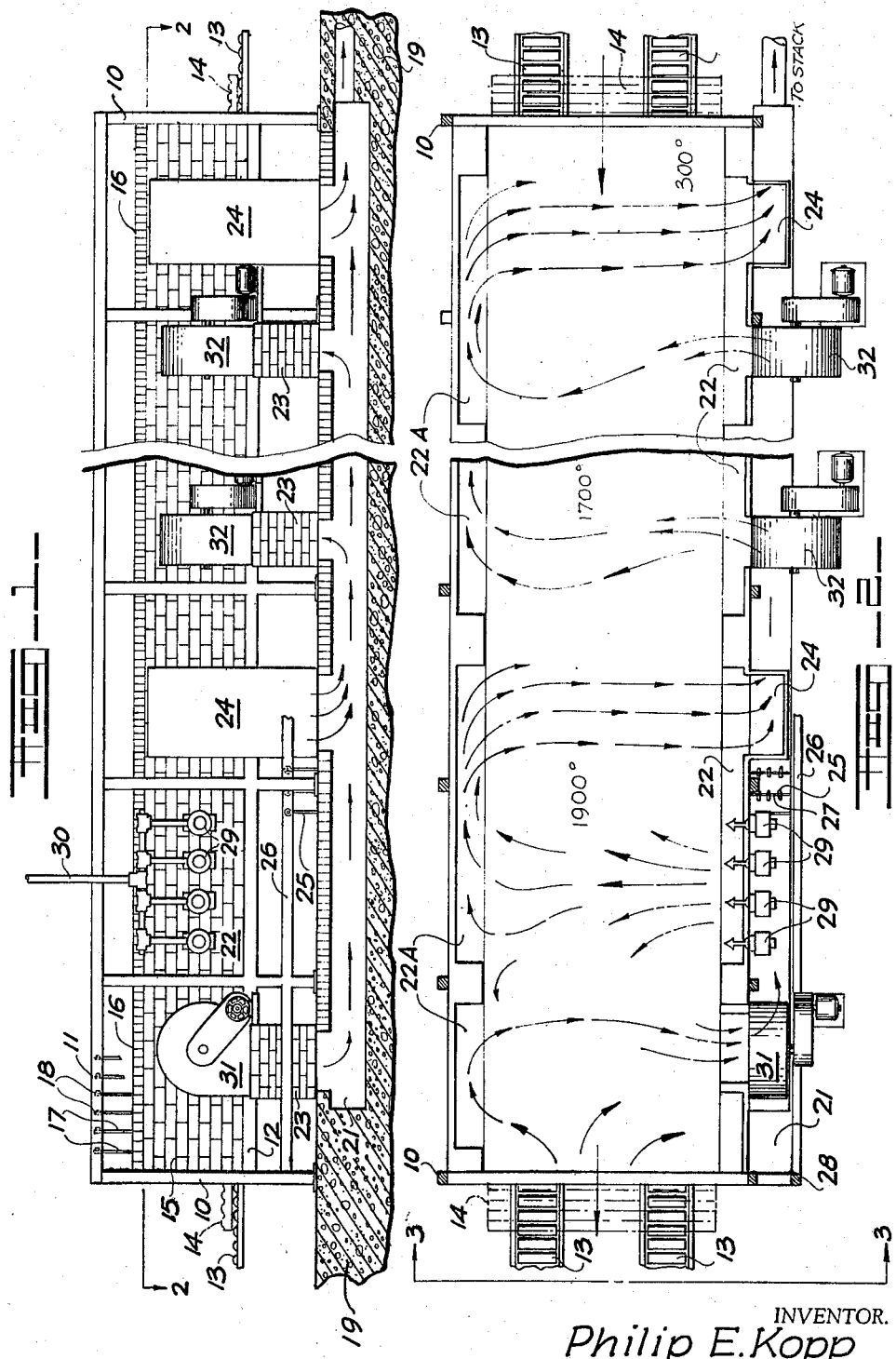
INVENTOR.
Philip E. Kopp
BY
W. B. Hampman
ATTORNEY.

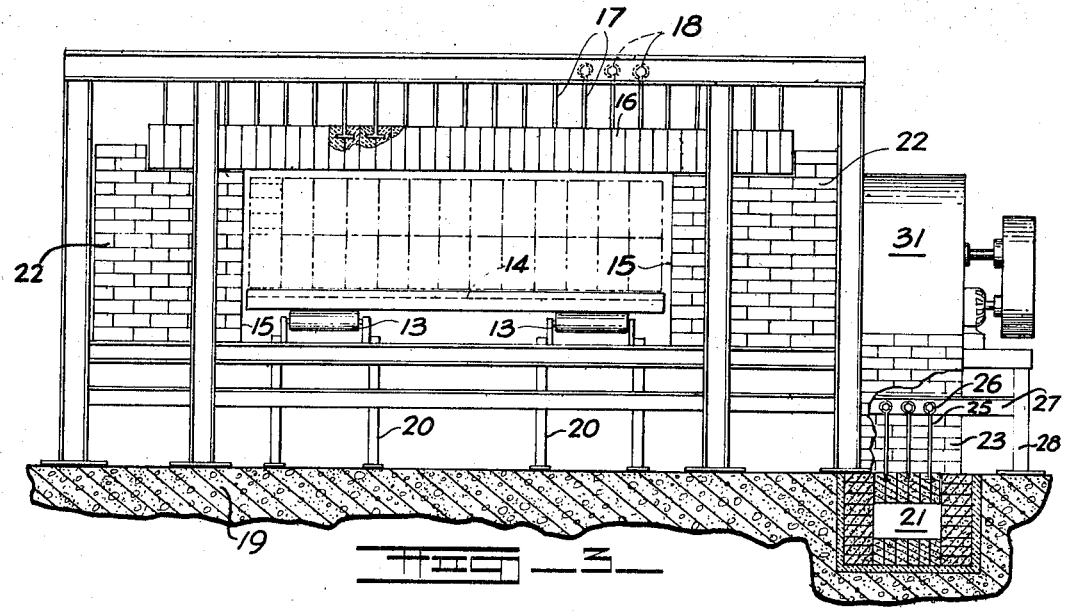
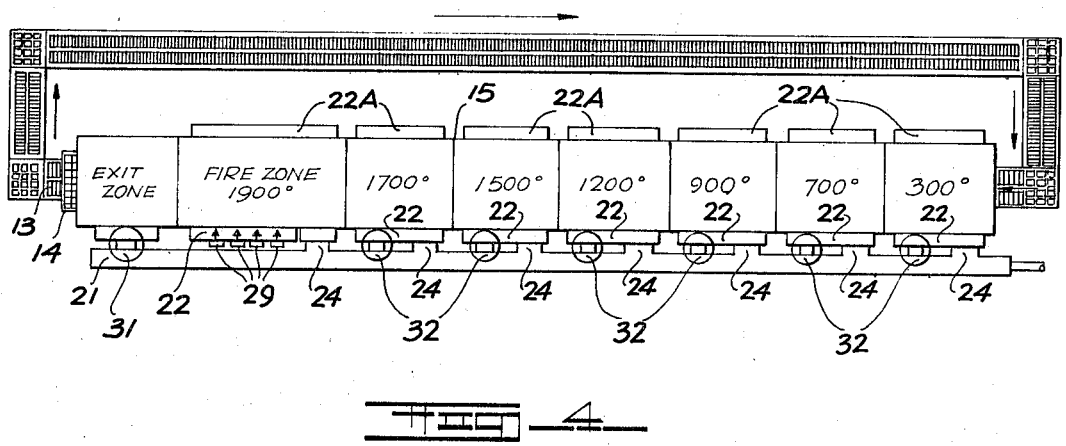

United States Patent Office 3,495,309
Patented Feb. 17, 1970

3,495,309
**CONTINUOUS KILN WITH VARYING
TEMPERATURE ZONES**
Philip E. Kopp, 620 Ridgeleigh Drive,
Minerva, Ohio 44644
Filed June 1, 1967, Ser. No. 642,896
Int. Cl. F27b 9/16
U.S. Cl. 25—142                                   5 Claims

ABSTRACT OF THE DISCLOSURE

An apparatus for firing ceramic ware including progressive temperature zones with a heat source adjacent one end of said apparatus and means for moving heat out of and into said apparatus in each of said progressive heat zones.

This invention relates to a continuous kiln and more particularly to a tunnel-like continuous kiln and means for heating the same progressively longitudinally thereof, so that ware moving therethrough may be suitably fired therein.

A further object of the invention is the provision of a continuous kiln in which heat in the form of combustion and products of combustion of a burnable fuel are introduced adjacent one end of the kiln and moved transversely thereof and subsequently removed therefrom and reintroduced at another location.

A further object of the invention is the provision of a continuous tunnel-like kiln having a conveyor longitudinally thereof and heat resistant pallets movable on said conveyor for moving ware longitudinally of said kiln, and wherein said kiln has oppositely disposed bays spaced longitudinally thereof and means for directing heat transversely of said kiln between said bays so as to fire the ware located therebetween.

The continuous kiln disclosed herein comprises an improvement in the art of firing ceramic articles such as structural clay members including building blocks and the like. Heretofore continuous kilns have required complicated firing means. The present invention concentrates the firing at a location adjacent one end of the continuous kiln and in an area of the highest temperature in the kiln. The combustion by-products and the heat generated in this area are then removed therefrom into an auxiliary heat conveying duct and reintroduced into the continuous kiln at intervals therealong and subsequently removed therefrom, so as to produce a plurality of longitudinally positioned temperature zones, each of which operates at a progressively lower temperature and with the lowest temperature zone adjacent the entry end of the continuous kiln.

The continuous kiln disclosed herein eliminates the complicated firing over the length of the kilns heretofore known in the art, and advantageously brings the temperature of the ware being fired progressively upwardly to the desired peak temperature with a simple and efficient construction that controls the heat in the kiln effectively for the intended purpose.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side elevation with parts broken away showing the continuous kiln.

FIGURE 2 is a cross-sectional top plan view taken on line 2—2 of FIGURE 1.

FIGURE 3 is an enlarged end elevation of the discharge end of the continuous kiln.

FIGURE 4 is a diagrammatic illustration of the continuous kiln showing the plurality of temperature zones longitudinally thereof.

By referring to the drawings, and FIGURES 1 and 2 in particular, it will be seen that a continuous kiln has been disclosed which comprises an elongated refractory tunnel formed of refractory brick positioned in a supporting steel structure which includes vertical posts 10 and transversely and longitudinally extending beams 11 at their upper ends supporting the roof of the continuous kiln and secondary transversely and longitudinally extending beams 12 therebelow supporting a conveyor 13 and a plurality of pallets 14 thereon forming the floor of the kiln.

The kiln itself is defined by sidewalls 15 and a suspended roof 16, both of which are formed of refractory brick. The refractory brick of the roof 16 are suspended on hangers 17 which in turn are supported by longitudinally extending tubular members 18 which are positioned between and supported by the transversely extending beams 11 heretofore referred to. The posts 10 extend downwardly below the conveyors 13 and the pallets 14 thereon as well as below the bottom portions of the sidewalls 15 and are carried by a thick supporting concrete slab 19. The conveyor 13 is additionally supported by secondary posts 20 which are also carried on the concrete slab 19.

By referring again to FIGURE 1 of the drawings, it will be seen that a longitudinally extending refractory lined heat tunnel 21 is positioned beneath the slab 19 and at one side of the continuous kiln as defined by the refractory walls 15 and the metal posts 10 and beams 11, etc. The sidewalls 15 of the continuous kiln are formed in a plurality of longitudinally spaced oppositely disposed bays 22, with the bays on the side of the continuous kiln adjacent the heat tunnel 21 communicating therewith by means of refractory ducts 23 and 24.

The upper or roof portion of the heat tunnel 21 is formed of refractory brick suspended by hangers 25 which extend above the heat tunnel 21 and are in turn supported by longitudinally extending tubular supports 26. The tubular supports 26 are carried by horizontal extensions 27 of the structural framework of the continuous kiln and the extensions are supported by secondary posts 28.

By referring again to FIGURE 1 of the drawings, it will be seen that a plurality of burners 29 are located on one side of the continuous kiln and in communication with one of the bays 22. The burners are supplied with a fuel such as natural gas by way of a supply line 30. Burning gas and the products of combustion thereof are thus introduced into the continuous kiln in the bay 22 which locates the burners 29 and directed thereby transversely of the kiln and into the oppositely disposed bay 22–A as seen in the horizontal cross-section comprising FIGURE 2 of the drawings. A firing temperature in the area between the bays 22 and 22–A and adjacent the burners 29 is thus obtained. Directional arrows in FIGURE 2 of the drawings show the path of the burning gas and products of combustion introduced into this firing zone and wherein a firing temperature of approximately 1900 degrees F. is obtained as hereinbefore described.

Still referring to FIGURES 1 and 2 of the drawings, it will be seen that this firing zone is spaced with respect to the exit end, the left end of the continuous kiln, as seen in FIGURES 1 and 2 of the drawings, by an exit zone and will be obvious that some of the burning gases and products of combustion representing the heat introduced into the kiln will move into this exit zone along with the ware which is moving from right to left continuously on the pallets 14 on the conveyor 13. In order that this heat may be removed for reuse in the continuous kiln, a vacuum fan 31 communicates with the exit zone and constantly removes the heat products of combustion, etc. from the same and introduces them downwardly through one of the refractory ducts 23 into the heat tunnel 21, where they flow to the right as seen in FIGURES 1 and 2. The refractory duct 24 adjacent the burners 29 and in communications with the bay 22 also provides a means of removing the heat and products of combustion as the same flow downwardly therethrough and into the heat tunnel 31, again as best illustrated in FIGURE 2 of the drawing and shown by the directional arrows therein.

By referring to FIGURE 4 of the drawing, a schematic view of the continuous kiln may be seen, and it will be observed that there are a plurality of heat zones longitudinally of the device as defined by the opposed bays 22 and 22-A which are spaced longitudinally along the opposite sides of the continuous kiln. The extreme right end of the kiln is the entrance end and ware is positioned on the pallets 14 which rest on the conveyor 13 and the same are then moved progressively from right to left through the kiln and through the heat zones which will steadily increase the temperature beginning at approximately 300 degrees adjacent the entrance end and terminating in the firing zone at 1900 degrees, as hereinbefore described. The intermittent zones are arranged to bring the temperature of the ware up progressively as by 200 degree steps, more or less, and it will be obvious that a number of such zones are therefore necessary. Each of the zones is supplied with heat by an inlet fan 32 which communicates with the heat tunnel 21 and brings the heated air, products of combustion, etc. up out of the same, introduces it into the kiln where it moves transversely through the ware into the opposed bay area and then circulates back transversely of the ware and into one of the refractory ducts 24 which communicate with each of the temperature zones which are defined by the opposed bays 22 and 22-A. It will thus be seen that the extremely high temperature air and products of combustion from the highest temperature zone and the exit zone immediately there-adjacent, are moved downwardly into the heat tunnel 21 and that some of the high temperature air and products of combustion are moved upwardly by the inlet fans 32 into each of the progressively longitudinally spaced lower temperature zones and then returned to the heat tunnel by the plurality of refractory ducts 24. Each of the inlet fans 32 is in communication with the heat tunnel 21 by way of one of the refractory ducts 23 heretofore described.

It will thus be seen that an extremely efficient and economical continuous kiln has been disclosed which concentrates its combustion and firing temperatures in an area thereof spaced from the exit end and that the heat from this firing zone is removed and reintroduced into each of the successive lower temperature zones longitudinally spaced relative to the firing zone. Thus ware at room temperature introduced at the extreme right end of the continuous kiln will be subjected initially to a 300 degree temperature and as it moves innto the next zone the temperature will advance between 200 and 300 degrees and that this will continue to occur as the ware moves progressively to the left through the continuous kiln, as illustrated for example, in FIGURES 1 and 2 of the drawings. It will thus occur to those skilled in the art that by the time the ware reaches the highest temperature firing zone wherein 1900 degrees is maintained, the ware will be close to that temperature and that it will then be suitably fired in that high temperature zone. The residual heat in the wares as it moves on into the exit zone is transferred to the air entering the kiln through the exit opening, and this is moved forcibly by the vacuum fan 31 down into the heat tunnel 21, as hereinbefore described. The residual heat in the heat tunnel remaining at the entrance end of the kiln and adjacent the 300 degree zone is preferably vented to a stack to the atmosphere so that continual circulation of the hot air and products of combustion can be maintained in the heat tunnel, which is essential to the successful operation of the device.

It will occur to those skilled in the art that suitable dampers are incorporated in the refractory ducts 23 through which the heat is moved upwardly out of the heat tunnel 21 into each of the several temperature zones and that the temperature on each of the zones may thus be readily controlled. Alternately, atmospheric air inlets controlled by dampers may be installed in the refractory ducts 23 which may then be used to control the temperature in the particular zone concerned.

It will thus be seen that a continuous kiln having a novel firing arrangement has been disclosed and wherein the firing is concentrated in one area thereof and the heat resulting from firing said area moved into progressively spaced areas longitudinally of the kiln to obtain progressively increasing temperatures from the entrance end of the kiln to the firing area. It will thus be seen that a continuous kiln meeting the several objects of the invention has been disclosed, and having thus described my invention, what I claim is:

1. A continuous kiln for ceramic ware comprising a tunnel through which the goods to be fired are moved, the tunnel having longitudinally spaced pair of oppositely disposed bays in its sides, the bays of each pair being open into the tunnel kiln and closed exteriorly and defining therebetween a heat zone, a heat tunnel extending along said tunnel kiln, burner means in one of said bays adjacent one end of said tunnel kiln and means on either side of said bay in which said burners are positioned for moving heat out of said tunnel kiln and into said heat tunnel, primary means in each pair of said other longitudinally spaced bays for moving heat from said heat tunnel into said tunnel kiln and secondary means in each pair of said bays communicating with said heat tunnel and forming a return path for said heat.

2. The continuous kiln set forth in claim 1 and wherein said kiln has a plurality of heat zones longitudinally thereof and an exit zone adjacent one end thereof, and wherein said burners are located in the one of said heat zones adjacent said exit zone.

3. The continuous kiln set forth in claim 1 and wherein the means for moving heat out of said tunnel kiln and into said heat tunnel comprises at leat one vacuum fan and a plurality of ducts.

4. The continuous kiln set forth in claim 1 and wherein said primary means for moving heat from said heat tunnel into said tunnel kiln comprises a plurality of vacuum fans.

5. The continuous kiln set forth in claim 1 and wherein said tunnel kiln consists of a refractory top and side walls, a conveyor in the bottom of said tunnel kiln and a plurality of pallets on said conveyor arranged to form a movable floor in said tunnel kiln.

References Cited

UNITED STATES PATENTS

| | | | |
|---|---|---|---|
| 1,768,486 | 6/1930 | Ogden | 25—142 |
| 2,928,158 | 3/1960 | Miller | 25—142 |
| 2,959,836 | 11/1960 | Hanley | 25—142 |
| 3,108,351 | 10/1963 | Hermans | 25—142 |

WILLIAM J. STEPHENSON, Primary Examiner